May 19, 1936.  L. M. FRANCIS  2,041,124

FIFTH WHEEL CONSTRUCTION FOR DETACHABLE TRAILERS

Filed Sept. 24, 1931　　2 Sheets-Sheet 1

INVENTOR.
LYNN M. FRANCIS
BY
ATTORNEY.

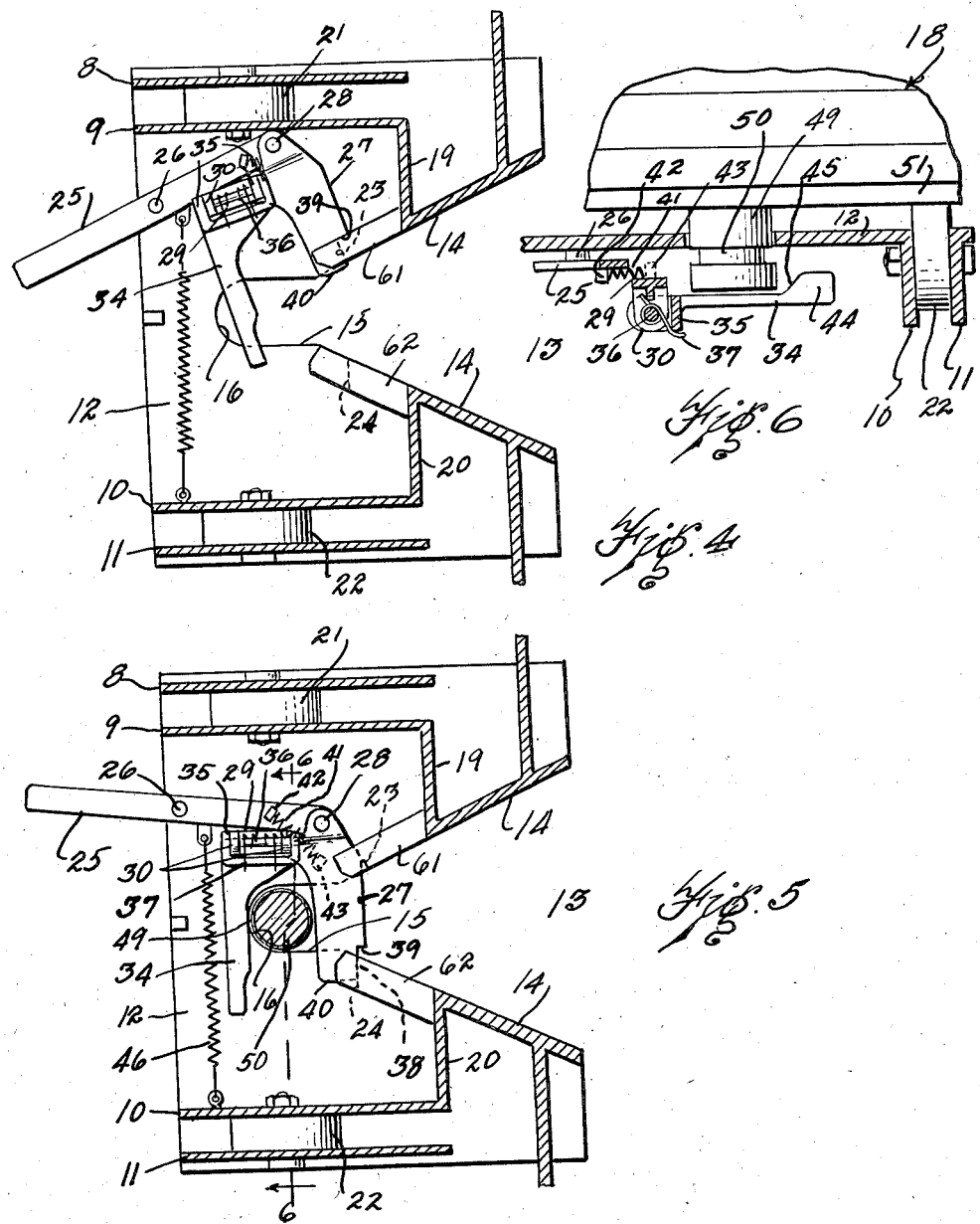

Patented May 19, 1936

2,041,124

UNITED STATES PATENT OFFICE 2,041,124

FIFTH WHEEL CONSTRUCTION FOR DETACHABLE TRAILERS

Lynn M. Francis, Detroit, Mich., assignor to Mechanical Handling Systems Incorporated, Detroit, Mich., a corporation of Michigan Application September 24, 1931, Serial No. 564,826

6 Claims. (Cl. 280—33.1)

This invention relates to fifth wheel construction for detachable trailers and an object of the invention is to provide a relatively cheap and easily operable mechanism which will permit a trailer to be quickly and easily attached or detached from a motor vehicle.

Another object of the invention is in the provision of a fifth wheel construction so designed as to permit the king pin on the trailer to be disengaged from the motor vehicle by movement of a lever and which will automatically lock the king pin to the fifth wheel mechanism as the rear end of the truck is backed into place beneath the forward end of the trailer.

Another object of the invention is in the provision of a fifth wheel structure which consists of a lock bar for locking the king pin to the fifth wheel, the same being mounted upon one end of a pivoted operating lever so that the same may be manually retracted and latched and a second bar positioned in the path of travel of the king pin to be engaged thereby when the king pin is being moved into the fifth wheel, the same being so mounted as to release the locking bar from its retracted latched position when engaged by the king pin.

Another object of the invention is in the provision of a fifth wheel structure in which a pair of rollers are mounted extending above the face of the upper plate thereof for carrying the weight of the forward end of the trailer thereby providing a flexible support between the rear end of the truck and the forward end of the trailer.

These objects and the several novel features of the invention are hereinafter more fully described and claimed and the preferred form of construction by which these objects are attained is shown in the accompanying drawings in which—

Fig. 4 is an inverted plan sectional view taken substantially on line 4—4 of Fig. 3 showing the locking bar in its retracted position.

Fig. 5 is a similar view showing the locking bar in its locked position.

Fig. 6 is a detail sectional view taken on line 6—6 of Fig. 5.

Figure 1:
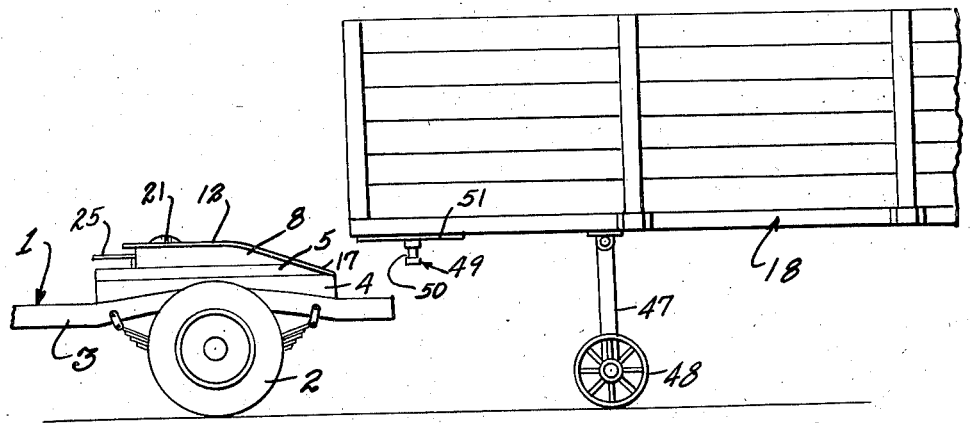
Fig. 1 is a side elevational view of a motor vehicle embodying my invention and a trailer detached therefrom.

Referring to the drawings, the motor vehicle 1 is provided with the usual road wheels 2 and the side frames 3 of channel construction. The filler blocks 4 are mounted upon the upper face of the channels 3 and the longitudinally extending angles 5 rest upon the upper face of the filler block 4. The angles 5, the filler blocks 4 and the channels 3 are secured together by means of the bolts 6. A transverse angle bar 7 is preferably welded to the angles 5 near the forward end thereof. The longitudinally extending plates 8, 9, 10 and 11 are preferably welded to the transverse angle 7 and to the plate 12.

Figure 2:
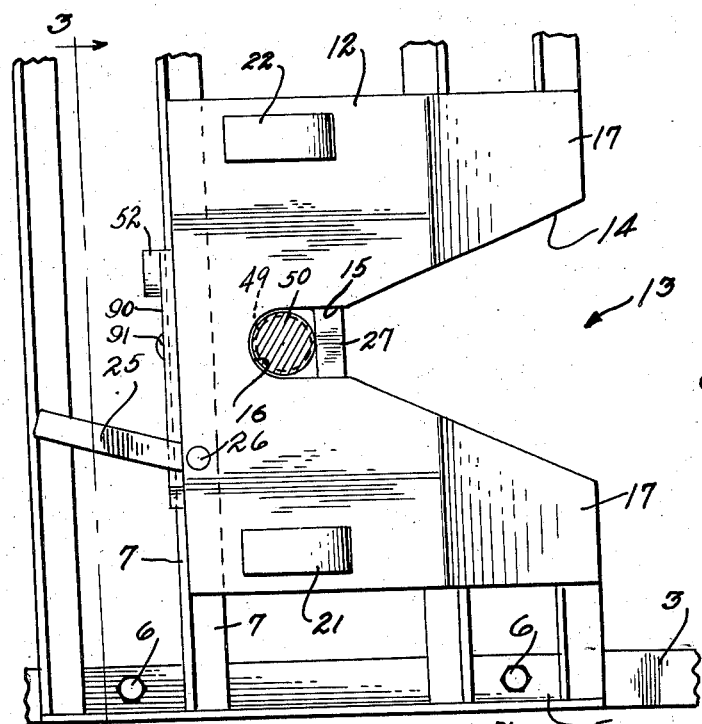
Fig. 2 is a top plan view of my invention.
Figure 3:
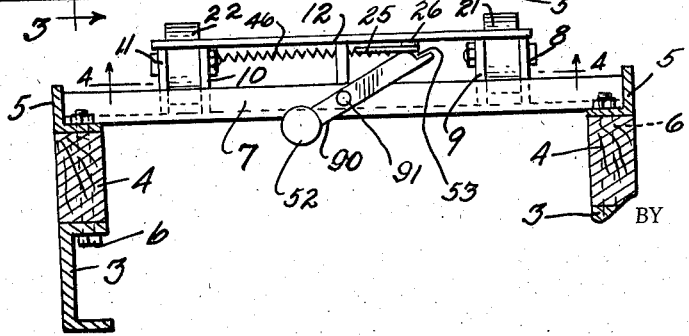
Fig. 3 is a section taken substantially on line 3—3 of Fig. 2.

It will be seen that the rear end of the plate 12 is bifurcated at 13 forming the tapered opening 14 the straightaway portion 15 and the rounded forward end 16 and it will be further seen that rearward end of the plate is downwardly inclined at 17 to permit the motor vehicle 1 to be easily backed under the trailer 18. The vertically extending plates 19 and 20 are welded respectively to the longitudinal plates 9 and 10 and both are welded to the plate 12. A roller 21 is pivotally mounted between the plates 8 and 9 and the periphery of the same extends slightly above the upper face of the plate 12 and in like manner a roller 22 is pivotally mounted between the plates 10 and 11 and the periphery of the same extends the same distance above the plate 12 as the roller 21, for a purpose to be later described. The bars 61 and 62 are preferably welded to the upper plate 12 and the inner faces of the bars preferably align with the tapered portion 15 of the bifurcation 13. The end of the bar 61 is slotted at 23 and the end of the bar 62 is slotted at 24 for a purpose to be later described. A lever 25 is pivotally mounted at 26 to the lower face of the plate 12 and one end of the same extends forwardly of the plate as best seen in Fig. 2. A locking bar 27 is pivotally secured at 28 to the rear end of the lever 25 and is provided with the extension 29 and a pair of depending ears 30 are formed integral therewith. A releasing arm 34 is provided with the bifurcated end 35 and a pin 36 extends through the bifurcated end and also through the depending ears 30.

A spring 37 is so positioned as to normally hold the arm 34 in approximately a horizontal plane and it will be understood that a suitable stop will be provided for limiting the upward movement of the arm. One end of the locking bar 27 is provided with the notch 38 the same forming a shoulder 39 which engages behind the solid portion of the bar 21 while the portion 40 extends into the notch 23. It will therefore be seen that when the parts are in the position shown in Fig. 4 the locking bar 27 will be clear of the tapered aperture 14 while a portion of the releasing arm 34 will be aligned with the portion 15 of the aperture for a purpose to be later described. A compression spring 41 abuts an extension 42 provided upon the lever 25 while the opposite end abuts an extension 43 provided upon the locking bar 27 so that the tendency of the spring 41 is to move the locking bar forward so that when the parts are in the position shown in Fig. 4 the shoulder 39 will engage behind the solid portion of the bar 61. The releasing arm 34 has its free end provided with the enlarged portion 44 lying in a vertical plane the same being provided with a sloping edge 45. A tension spring 46 has one end secured to the portion of the lever 25 between the pivots 26 and 28 and has its other end connected to the plate 10. It will be seen that the tendency of the spring 46 is to move the parts to the position shown in Fig. 5.

The trailer 18 is supported near its forward end by means of the legs 47 carrying the ground wheels 48 at their lower ends, the same being of any desired construction, and will support the weight of the forward end of the trailer when the motor vehicle 1 has been detached therefrom. A king pin 49 is provided with the reduced portion 50 and is mounted in the wear plate 51 secured to the bottom of the trailer 18. It is to be understood that the road wheels (not shown) of the trailer 18, may be provided with suitable braking mechanism or blocks may be placed in front and behind the wheels to prevent movement of the trailer 18 when the motor vehicle 1 is being attached or detached therefrom. When it is desired to attach the trailer 18 to the truck 1 the truck will be aligned longitudinally with the trailer and then backed up and the sloping end 17 will strike against the wear plate 51 and raise the front end of the trailer a slight amount to permit the wheels 48 to be swung up out of the way. The king pin 49 will guide itself in the bifurcation 13 until the lower end of the same strikes against the portion 44 of the releasing arm 34 and moves the same toward the rounded end 16 of the bifurcation 13 and since the releasing arm is attached to the extension 29 on the locking bar 27 the shoulder 39 will be disengaged from the solid portion of the bar 61 until the rear edge of the same comes in alignment with the slot 23 whereupon the spring 46 will pull the locking bar behind the king pin 49 and the end 20 of the locking bar will pass into the notch 24 in the bar 62.

The shoulder 39 will then engage against the solid portion of the bar 62 and the parts will be in the position shown in Fig. 5 and the king pin will be securely held in the bifurcation 13 in the plate 12. It will be understood that the wear plate 51 will ride upon the upper periphery of the rollers 21 and 22 and the weight of the forward end of the trailer 18 being carried thereby. When it is desired to detach the trailer 18 from the truck 1 the lever 25 is moved by hand to the position shown in Fig. 4 and it will be seen that the end of the locking bar 27 will clear the bifurcation 13 and as the releasing arm 34 comes into contact with the king pin 49 the beveled face 45 will ride against the lower edge of the king pin and force the lifting arm down against the tension of the spring 37 so that the portion 44 of the lifting arm will pass under the lower face of the king pin. The supporting legs 47 will be then moved to their vertical position and as the motor vehicle 1 is moved forward the king pin will disengage from the plate 12. The weight of the forward end of the trailer 18 will then be carried by the supporting legs 47. If desired a latching bar 90 may be pivotally secured at 91 to the forward face of the angle 7 and provided on one end with the counter-weight 52 and at its other end with the notch 53. The notch 53 will engage against the lever 25 to lock the lever against accidental movement when the king pin is secured to the motor vehicle 1.

It will be seen that it is only necessary to lift the counter-weight 52 to permit the notch 53 to be disengaged from behind the lever 25 whereupon the same may be moved by hand about the pivot 26.

It will be seen that the axes of the rollers 21 and 22 lie in a transverse plane extending through the vertical axis of the king pin when the trailer and motor vehicle are connected together and since the king pin 49 is less in diameter than the width between the straight away portion 15 of the bifurcation 13, a slight rocking motion will be permitted between the motor vehicle and the trailer and further the weight of the end of the trailer on which the king pin is mounted will be carried by the periphery of the rollers 21 and 22 and since the axes of the rollers 21 and 22 are in the same plane as the axis of the king pin the trailer will have a free turning movement about the axis of the king pin.

From the foregoing description it becomes evident that I have provided a novel fifth wheel construction which is relatively cheap to manufacture and will permit a motor vehicle to be quickly and easily engaged or disengaged from the forward end of a trailer, and further that the device is rigid in construction and composed of relatively few parts which will not easily get out of order or operation.

Having thus fully described my invention, its utility and mode of operation, what I claim and desire to secure by Letters Patent of the United States is

1. A fifth wheel construction for connecting a trailer and a motor vehicle together including a depending king pin on the trailer, a bifurcated plate secured to the motor vehicle, a locking bar movable relative to the plate for locking the king pin thereto, a lever pivotally connected to the plate and to the locking bar for manually retracting the locking bar from its locked position, one end of the locking bar provided with a notch, a pair of lock bar engaging members one positioned on each side of the bifurcation and each secured to the plate for engaging the lock bar at two points to take the strain exerted by the pull of the king pin on the lock bar, and means for causing the notch in the lock bar to engage behind one of the lock bar engaging members to hold the lock bar in its retracted position, a releasing arm connected to the locking bar and adapted to be engaged by the king pin when the plate is being moved to engagement therewith for freeing the locking bar from its retracted position, and means for automatically moving the same to lock the king pin in the bifurcation in the plate.

2. In a fifth wheel construction for connecting a trailer and a motor vehicle together including a depending king pin extending from the trailer, a bifurcated plate secured to the motor vehicle, a pair of rollers pivotally mounted in the plate, the plate provided with a pair of apertures through which the upper periphery of each of the respective rollers extends for forming an antifriction support for the end of the trailer to which the king pin is attached, and means for locking the king pin in the bifurcation in the plate.

3. In a fifth wheel construction for connecting a trailer and a motor vehicle together including a depending king pin extending from the trailer, a bifurcated plate secured to the motor vehicle and provided with a pair of apertures positioned on each side of the bifurcation in the plate, a pair of rollers each pivotally mounted in the plate, the axis of each roller aligned and lying in a transverse vertical plane extending through the vertical axis of the king pin when the same is connected to the plate, the periphery of one roller extending through each one of the apertures in the plate and extending above the upper face thereof to form an anti-friction rocking support for the end of the trailer to which the king pin is attached, and means for locking the king pin in the bifurcation in the plate.

4. In a fifth wheel construction for connecting a trailer and motor vehicle together including a depending king pin extending from the trailer, a bifurcated plate secured to the motor vehicle and provided with a plurality of apertures, a plurality of rollers pivotally mounted in the plate, one roller positioned beneath each of the apertures, the periphery of the same extending through the aperture and above the upper face of the plate for providing an anti-friction support for the end of the trailer to which the king pin is attached and means for locking the king pin to the bifurcation in the plate.

5. In a fifth wheel construction for connecting a trailer and a motor vehicle together including a depending king pin extending from the trailer, a bifurcated plate stationarily secured to the motor vehicle, a pair of rollers pivotally supported in the plate, the upper periphery of the same extending above the upper face of the plate providing an anti-friction support for the end of the trailer to which the king pin is attached, and means for locking the king pin to the bifurcation in the plate.

6. In a fifth wheel construction for connecting a trailer and a motor vehicle together including a depending king pin extending from the trailer, a bifurcated plate secured to the motor vehicle, the rear end of the same provided with a downwardly sloping portion for lifting the forward end of the trailer when the end of the motor vehicle carrying the plate is moved thereunder, a plurality of rollers pivotally mounted in the plate, the periphery of the same extending above the upper face of the plate providing an anti-friction bearing for the end of the trailer on which the king pin is mounted and means for locking the king pin in the bifurcation in the plate.

LYNN M. FRANCIS.